(12) United States Patent
Chen et al.

(10) Patent No.: US 10,405,481 B2
(45) Date of Patent: Sep. 10, 2019

(54) AGRICULTURAL HARVESTING HEAD WITH A GAUGE AND TRANSPORT WHEEL ARRANGEMENT

(71) Applicant: Deere & Company, Moline, IL (US)

(72) Inventors: Jixin Chen, Silvis, IL (US); Michael L. Vandeven, Princeton, IA (US)

(73) Assignee: Deere & Company, Moline, IL (US)

( * ) Notice: Subject to any disclaimer, the term of this patent is extended or adjusted under 35 U.S.C. 154(b) by 90 days.

(21) Appl. No.: 15/499,956

(22) Filed: Apr. 28, 2017

(65) Prior Publication Data

US 2018/0310462 A1  Nov. 1, 2018

(51) Int. Cl.
| | | |
|---|---|---|
| A01B 73/00 | (2006.01) | |
| A01D 41/06 | (2006.01) | |
| A01D 75/00 | (2006.01) | |
| A01B 73/02 | (2006.01) | |

(52) U.S. Cl.
CPC ........... *A01B 73/00* (2013.01); *A01B 73/005* (2013.01); *A01D 41/06* (2013.01); *A01D 75/002* (2013.01); *A01B 73/02* (2013.01)

(58) Field of Classification Search
CPC ....... A01B 73/00; A01B 73/005; A01B 73/02; A01B 15/14; A01B 23/04; A01D 41/06; A01D 41/144; A01D 75/002
See application file for complete search history.

(56) References Cited

U.S. PATENT DOCUMENTS

| | | | | |
|---|---|---|---|---|
| 3,457,709 A | * | 7/1969 | Reimer | A01D 75/002 56/11.9 |
| 3,721,461 A | * | 3/1973 | Nelsen | A01B 73/005 172/1 |
| 4,026,365 A | * | 5/1977 | Andersson | A01B 63/22 172/386 |
| 4,089,430 A | | 5/1978 | Gosselin | |
| 5,031,394 A | * | 7/1991 | Honey | A01D 43/077 172/285 |
| 5,243,810 A | * | 9/1993 | Fox | A01B 73/005 56/14.4 |
| 6,209,297 B1 | * | 4/2001 | Yeomans | A01B 73/005 56/14.9 |
| 7,162,854 B2 | | 1/2007 | Yeomans et al. | |
| 7,197,865 B1 | * | 4/2007 | Enns | A01B 73/005 56/228 |

(Continued)

FOREIGN PATENT DOCUMENTS

| | | | | |
|---|---|---|---|---|
| CA | 1188899 A | * | 6/1985 | ........... A01B 73/005 |
| DE | 2132135 A1 | * | 2/1972 | ........... A01B 73/005 |

(Continued)

OTHER PUBLICATIONS

Search Report issued in counterpart application No. EP18169483.7, dated Jul. 6, 2018 (6 pages).

*Primary Examiner* — Alicia Torres
*Assistant Examiner* — Adam J Behrens
(74) *Attorney, Agent, or Firm* — Rathe Lindenbaum LLP (57) ABSTRACT

An agricultural harvesting head for an agricultural combine has a first gauge wheel assembly coupled to a laterally extending frame that is convertible from (a) a harvesting position in which the first gauge wheel assembly supports the frame during crop harvesting, to (b) a transport position in which the first gauge wheel assembly supports the at least one section for transport on the road.

19 Claims, 6 Drawing Sheets

(56) References Cited

U.S. PATENT DOCUMENTS

| | | | | |
|---|---|---|---|---|
| 7,552,579 B2* | 6/2009 | Tippery | ............... | A01B 73/005 |
| | | | | 280/641 |
| 7,926,249 B1* | 4/2011 | Cook | ................... | A01B 73/005 |
| | | | | 172/240 |
| 8,025,312 B1* | 9/2011 | Honas | .................. | A01D 75/002 |
| | | | | 280/769 |
| 8,292,328 B2* | 10/2012 | Honas | .................. | A01D 75/002 |
| | | | | 280/769 |
| 2018/0098496 A1* | 4/2018 | Silver | .................... | A01D 41/06 |

FOREIGN PATENT DOCUMENTS

| | | | | |
|---|---|---|---|---|
| EP | 1905294 A1 | 4/2008 | | |
| WO | WO-2014/101908 | * | 7/2014 | ............. A01B 61/00 |

* cited by examiner

AGRICULTURAL HARVESTING HEAD WITH A GAUGE AND TRANSPORT WHEEL ARRANGEMENT

FIELD OF THE INVENTION

This invention relates generally to agricultural harvesters. More particularly it relates to agricultural harvesting heads. More particularly it relates to agricultural harvesting heads for agricultural combines.

BACKGROUND OF THE INVENTION

Agricultural harvesters, such as agricultural combines, are designed to travel through agricultural fields harvesting crops. Agricultural combines receive crop severed from the ground and convey it to threshing, separating and cleaning devices within the agricultural combine.

In a typical arrangement, the agricultural harvesting head severs the crop from the ground and conveys it to the central region of the harvesting head where it is then conveyed rearward into a central and forwardly opening aperture in the front of the agricultural combine proper.

Agricultural harvesting heads are quite long, on the order of 10-15 m in overall length. In order to accurately follow the contours of the ground and sever crop at the appropriate point on the stem, agricultural harvesting heads have been made in sections that are generally hinged with respect to each other. A typical agricultural harvesting head of this type is formed in two or three sections that are pivotable with respect to each other. They pivot with respect to each other about a generally horizontal and fore-and-aft extending axis. Thus, a two section agricultural harvesting head would have one pivot axis, and a three-section agricultural harvesting head would have two pivot axes.

To follow the contours of the ground even better, the agricultural harvesting heads include gauge wheels that are mounted on the wing sections of the agricultural harvesting head. As these wheels roll across the ground during harvesting they help support the weight of wing sections.

In order to transport these larger agricultural harvesting heads, the harvesting heads are disconnected from the feederhouse of the combine, placed on a trailer, and then attached to a tractor vehicle to pull the agricultural harvesting head down the road to another field. This process is time-consuming. Further, it requires the purchase of an additional vehicle (the trailer). It may also include another vehicle such as a pickup truck or other tractor vehicle to tow the agricultural harvesting head while the agricultural combine is driven to the next field as well. It would also require an additional person to drive the pickup truck or other tractor vehicle.

To reduce the manpower and equipment required, harvesting heads that have replaceable/convertible wheels have been designed. In these harvesting heads, the gauge wheels can be pivoted, removed, and reinserted, or otherwise adapted to be road wheels. This process, however, is time-consuming and laborious.

In U.S. Pat. No. 5,243,810, a beam has two gauge wheels on opposing ends of the beam. A pivot joint located at one end of the beam permits the beam to rotate from a harvesting position to a transport position and supports one end of the beam. In the transport position, a prop 33A fixed to the other end of the beam supports the other end of the beam. Thus, the beam is supported at both ends on the frame of the agricultural harvesting head. This arrangement is awkward and laborious to manipulate and engage.

What is needed is a gauge wheel and transport wheel arrangement that reduces the time and effort required to convert an agricultural harvesting head into a transport configuration, and back again to a harvesting position.

It is an object of this invention to provide agricultural harvesting head with such a gauge wheel and transport wheel arrangement

SUMMARY OF THE INVENTION

In accordance with a first aspect of the invention, an agricultural harvesting head for an agricultural harvester comprises: a left frame section disposed to receive crop harvested on a left side of the agricultural harvesting head; a right frame section disposed to receive crop harvested on the right side of the agricultural harvesting head; a center frame section that is coupled to and disposed to receive the crop harvested from the left frame section and from the right frame section; and a first gauge wheel assembly coupled to at least one section of the left frame section and the right frame section that is convertible from a harvesting position in which the first gauge wheel assembly supports the at least one section during crop harvesting, to a transport position in which the first gauge wheel assembly supports the at least one section for transport on the road.

The first gauge wheel assembly may comprise: an elongate truss having a first end and a second end; a first wheel fixed to the first end of the elongate truss; and a second wheel fixed to the second end of the elongate truss.

The agricultural harvesting head may further comprise: a first pivot joint coupled between the elongate truss and the at least one section that permits the elongate truss and the wheels to pivot as an assembly about a first pivot axis that extends parallel to a longitudinal extent of the at least one section; and a second pivot joint coupled between the elongate truss and the at least one section that permits the elongate truss and the wheels to pivot as an assembly about a second pivot axis that extends vertically.

The elongate truss may comprise a bottom chord, a first top chord fixed to the bottom chord, and a web interconnecting the bottom chord and the first top chord when the first gauge wheel assembly is in the transport position.

The elongate truss may comprise the bottom chord, and a second top chord fixed to the bottom chord wherein the second top chord is different than the first top chord.

The first pivot joint may be coupled to an apex of the first top chord to permit the elongate truss to pivot about a vertical axis when the first gauge wheel assembly is in a transport position.

The first gauge wheel assembly may comprise a first truss and a second truss, wherein the first truss and the second truss share a bottom chord, and wherein the first truss has a first top chord, and the second truss has a second top chord.

The first truss and the second truss may be fixed at a right angle to each other, and further wherein the bottom chord extends parallel to a direction of travel "V" of the agricultural harvester in the harvesting position and extends parallel to the direction of travel "V" of the agricultural harvester in the transport position.

The first trust may be erect when the first gauge wheel assembly is in the transport position, and the second truss may be erect when the first gauge wheel assembly is in the harvesting position.

In accordance with a second aspect of the invention, an agricultural harvester may comprise: an agricultural combine; and an agricultural harvesting head supported on the front of the agricultural combine, wherein the agricultural harvesting head has a gauge wheel assembly.

The two wheels may be spaced apart a first distance in the harvesting position and are spaced apart the same distance in a transport position.

The two wheels may be fixed in position relative to each other as they move from the harvesting position to the transport position.

Each of the two wheels may be supported on an offsetting link that in turn is supported on the elongate truss such that each of the wheels rotates about an axis that is generally parallel to and offset from a bottom chord of the elongate truss.

The elongate truss may be generally triangular and may have an apex disposed midway between and above the first end and the second end.

The second pivot axis may be disposed equidistant to the first wheel and the second wheel.

The weight of the at least one section may be supported on the apex of the truss when the truss is in the transport position.

DETAILED DESCRIPTION OF THE PREFERRED EMBODIMENTS

Figure 1:
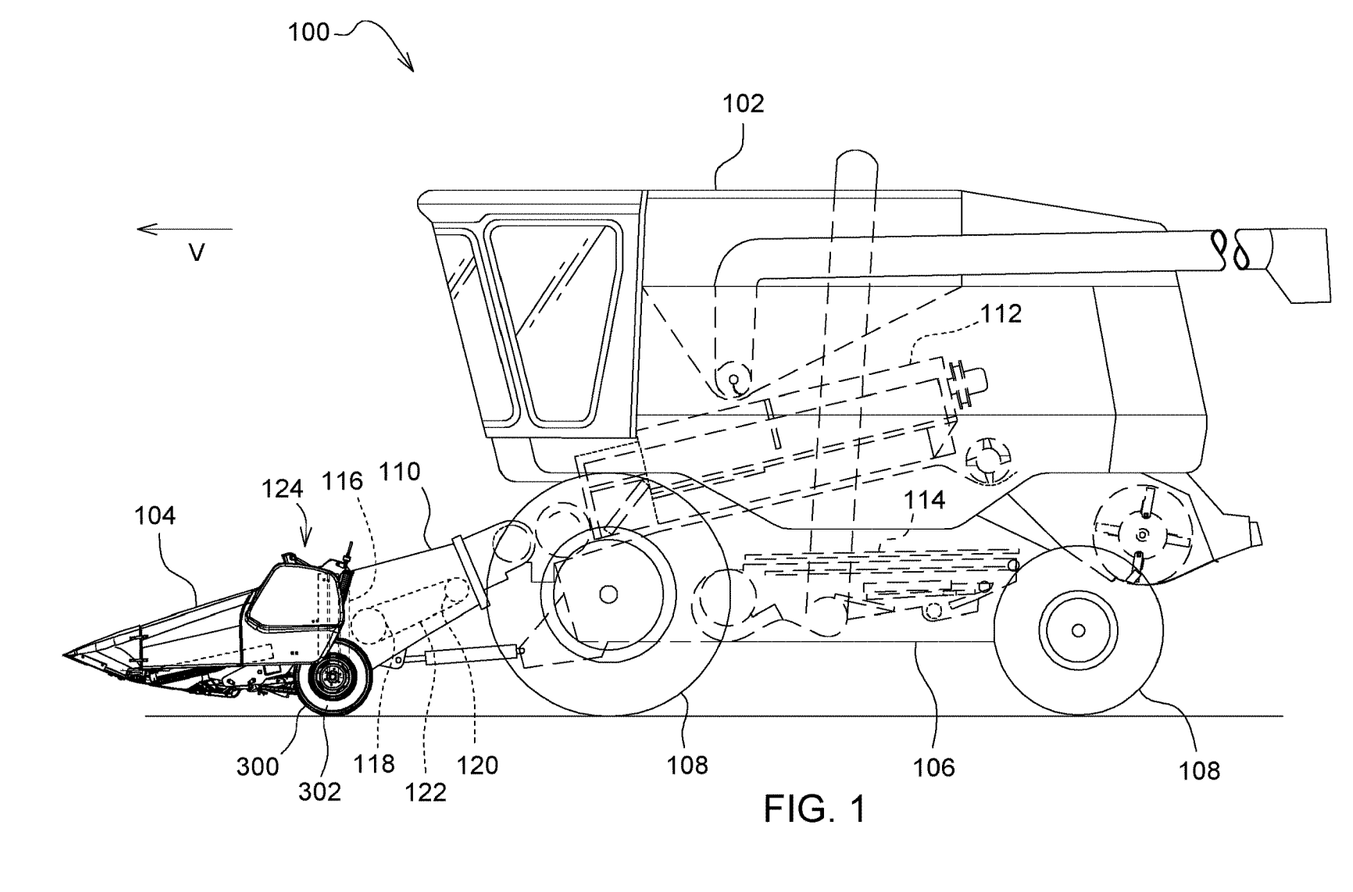
FIG. 1 illustrates an agricultural harvester in side view in accordance with the present invention showing the location of the gauge/transport wheels in their harvesting (i.e. gauge wheel) position.

In FIG. 1, an agricultural harvester 100 comprises an agricultural combine 102 and an agricultural harvesting head 104. The agricultural combine 102 comprises a chassis 106 which is supported on four ground supports 108, as well as a threshing and separating system 112, a cleaning system 114, and a feederhouse 110 extending forward from the front of the agricultural combine 102. The agricultural combine 102 further comprises a grain storage chamber (also known as a "grain tank" or "grain reservoir") that is disposed at the top of the agricultural combine 102 and receives grain that has been threshed, separated, and cleaned.

The agricultural combine 102 is a self-propelled vehicle which is driven over the ground by a power source such as electric motors or internal combustion engines. The ground supports 108 are preferably wheels or tracks. At least two of them are driven in rotation by motors to propel the agricultural combine 102 over the ground.

The feederhouse 110 is pivotally connected to the front of the agricultural combine and extends forward therefrom. The feederhouse 110 is generally in the form of a hollow and generally rectangular box having an endless belt conveyor disposed inside. The hollow rectangular box has an open forward end and an open rear end. The forward end of the feederhouse 110 defines a generally rectangular frame 116 that is configured to support the agricultural harvesting head 104. A front roller 118 is disposed immediately inside the frame 116. A corresponding rear roller 120 is disposed at the rear end of the feederhouse 110. The front roller 118 and the rear roller 120 support opposing ends of a conveyor belt 122. Each of the front roller 118 and the rear roller 120 may be in the form of a narrow shaft with a plurality of sprockets or gears that engage the inner surface of the conveyor belt 122. A rotary motor (electric or hydraulic) is coupled to the rear roller 120 to drive the rear roller 120 in rotation. This rotation causes the conveyor belt 122 to recirculate in an endless fashion around the front roller 118 and the rear roller 120. The conveyor belt 122 has protrusions, such as cleats or lugs that engage a top surface of a mat of cut crop (not shown) that is presented to the frame 116. The movement of the conveyor belt 122 draws the mat into the feederhouse and carries it upward on the floor of the feederhouse until it is conveyed through the open rear end of the feederhouse 110 and sent to the threshing, separating and cleaning systems of the agricultural combine 102.

The frame 116 is generally rectangular and includes a top member and a bottom member that are generally parallel to each other, are spaced apart, and extend generally parallel to the longitudinal extent of the agricultural harvesting head 104, and extend horizontally. That extends side to side a bottom horizontal member that is parallel to the top horizontal member. The frame 116 also includes a left side member and a right side member that are parallel to each other, spaced apart, and extend vertically.

Figure 2:
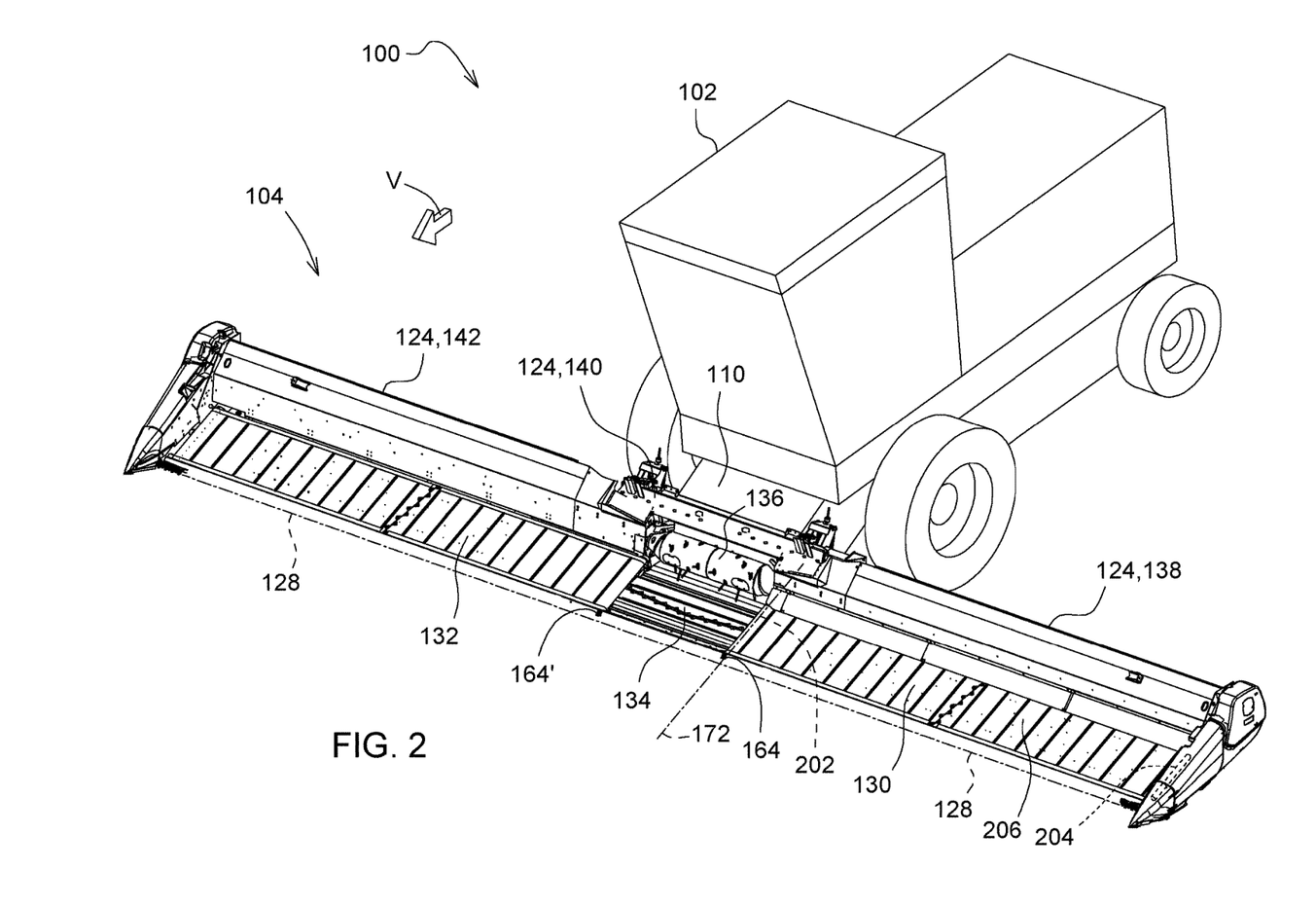
FIG. 2 illustrates the agricultural harvester of FIG. 1 in perspective view and showing details of the agricultural harvesting head.

The agricultural harvesting head 104 includes a laterally extending main frame 124 that extends perpendicular to a fore-and-aft harvesting direction of travel "V" of the agricultural harvester 100 and perpendicular to the longitudinal axis of the agricultural combine 102. The agricultural harvesting head 104 further includes an elongate reciprocating knife 128 that extends across almost the entire width of the agricultural harvesting head 104. This reciprocating knife is disposed immediately in front of three cut crop conveyors. These three cut crop conveyors include a left side conveyor 130 that carries cut crop from the left side of the agricultural harvesting head 104 to a central region of the agricultural harvesting head 104, a right side conveyor 132 that carries crop from the right side of the agricultural harvesting head 104 to the central region of the agricultural harvesting head 104, and a central conveyor 134 that receives crop from the left side conveyor 130 and the right side conveyor 132, and conveys the cut crop rearward and underneath a drum conveyor 136. Each of these three conveyors is an endless belt conveyor and is disposed immediately behind the reciprocating knife 128 to receive crop cut by the reciprocating knife 128.

The laterally extending main frame 124 includes three frame sections that are coupled together to pivot with respect to each other about fore-and-aft extending axes. Left frame section 138 extends from the outer left end of the agricultural harvesting head to a central region of the agricultural harvesting head 104. Center frame section 140 extends across a middle portion of the agricultural harvesting head 104. Right frame section 142 extends from the outer right end of the agricultural harvesting head 104 to the central region of the agricultural harvesting head 104.

The left side of conveyor 130 is supported on the left frame section 138. Several rollers, including a proximal roller 202 adjacent to the center frame section 140 and distal roller 204 adjacent to the leftmost end of the left frame section 138 are provided to support an endless belt 206. A motor (not shown) drives the proximal roller 202 in rotation. The proximal roller 202 recirculates in turn the endless belt 206 about the proximal roller 202 and the distal roller 204. Crop material cut by the reciprocating knife 128 in front of the left frame section 138 falls upon the top surface of the endless belt 206 and is drawn toward the center frame section 140.

The inner end of the left frame section 138 is connected to the center frame section 140 to pivot up and down at its outer end with respect to the center frame section 140. The inner end of the right frame section 142 is connected to the center frame section 140 to pivot up and down at its outer end with respect to the center frame section 140.

The Gauge Wheel Assembly

A gauge wheel assembly 300 is fixed to the left frame section 138. A similar gauge wheel assembly (in mirror image form) is fixed to the right frame section 142. In the discussion below, we will explain the construction and operation of the gauge wheel assembly 300. The same explanation is true of the gauge wheel assembly (not shown) on the right frame section 142. For ease of explanation we will not duplicate the description of the gauge wheel assembly on the right frame section 142.

The gauge wheel assembly 300 comprises a first wheel 302, a second wheel 304, an elongate truss 306, an elongate truss 307, a first pivot joint 308, and a second pivot joint 310.

The elongate truss 306 and the elongate truss 307 are formed as flat trusses that share a common bottom chord 316. Elongate truss 306 includes the bottom chord 316 and a top chord 318. Elongate truss 307 includes the bottom chord 316 and a top chord 320. Trusses 306, 307 extend outward from their common bottom chord 316 at an angle with respect to each other. This angle is preferably 90°. The wheels are fixed to opposing ends of the common bottom chord 316.

The elongate truss 306 includes a web 322 comprised of several elongate members that are joined at their ends and joined to the bottom chord 316 and the top chord 318 to form triangular regions in the otherwise open area between the triangle formed by the bottom for 316 in the top chord 318. The web 322 enhances the stiffness and rigidity of the elongate truss 306.

The chords of both trusses and the web 322 are preferably made of elongate tubular members, such as steel tubes.

Figure 3:
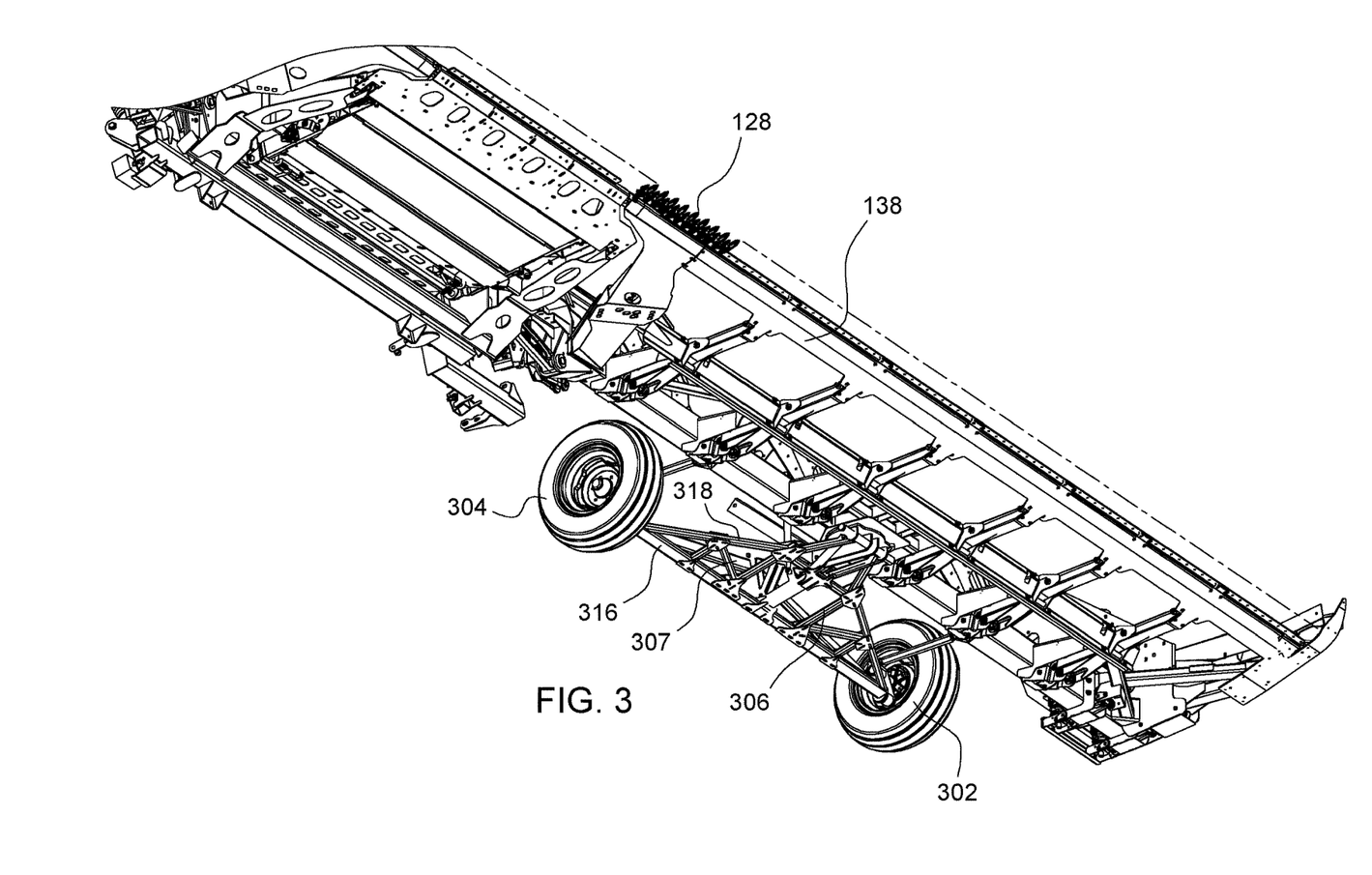
FIG. 3 is a fractional perspective underneath front view of the left frame section of the agricultural harvesting head of FIGS. 1-2 showing the gauge arrangement in a field position.

When the gauge wheel assembly 300 is in a harvesting position (see FIG. 3), the elongate truss 307 is erect (i.e. generally vertical) and the elongate truss 306 is not erect (i.e. generally horizontal). In this position, the first wheel 302 and the second wheel 304 support at least a portion of the weight of the left frame section 138 and the erect elongate truss 307 resists bending of the gauge wheel assembly 300 by the ground forces applied by the wheels to the ends of the bottom chord 316. These ground forces are applied vertically upward through the wheels to the outer ends of the elongate truss 307. These ground forces lie in the plane of the elongate truss 307, which is erect.

Figure 4:
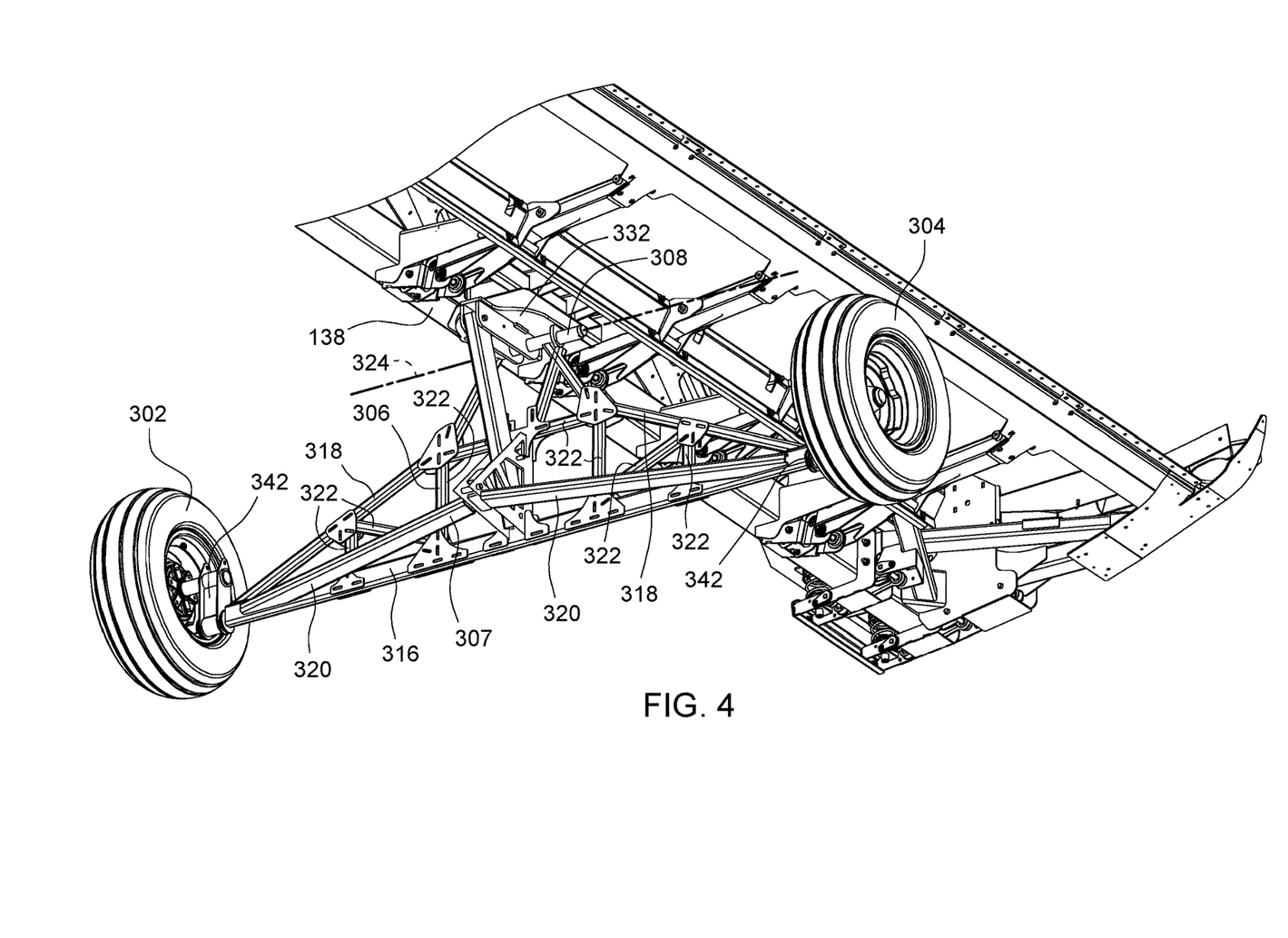
FIG. 4 is a fractional perspective underneath view of the left frame section of the agricultural harvesting head of FIGS. 1-3 showing the gauge wheel arrangement in a transport position.

When the gauge wheel assembly 300 is in a transport position (see FIG. 4) the elongate truss 306 is erect (i.e. generally vertical) and the elongate truss 307 is not erect (i.e. generally horizontal). In this position, the first wheel 302 and the second wheel 304 support at least a portion of the weight of the left frame section 138 and the erect elongate truss 306 resists bending the gauge wheel assembly 300 by the ground forces applied by the wheels to the ends of the bottom chord 316. These ground forces are applied vertically upward through the wheels to the outer ends of the elongate truss 306. These ground forces lie in the plane of the elongate truss 306, which is erect.

The gauge wheel assembly 300 is configured such that it can be pivoted as a single unitary member from its harvesting position to its transport position. This capability is provided by the first pivot joint 308 and the second pivot joint 310.

The first pivot joint 308 is coupled between the elongate truss 306 and the left frame section 138 to permit the gauge wheel assembly 300 to pivot about a pivot axis 324. When the gauge wheel assembly 300 is in the harvesting position, the pivot axis 324 extends in a direction transverse to the direction of travel "V", parallel to the longitudinal extent of the left frame section 138, parallel to the longitudinal extent of the bottom chord 316, and parallel to the rotational axes of the first wheel 302 and the second wheel 304.

The second pivot joint 310 is coupled between the elongate truss 306 and the left frame section 138 to permit the gauge wheel assembly 300 to pivot about a vertical pivot axis 326. When the gauge wheel assembly 300 is in the harvesting position and in the transport position, the pivot axis 324 extends vertically.

Figure 5:
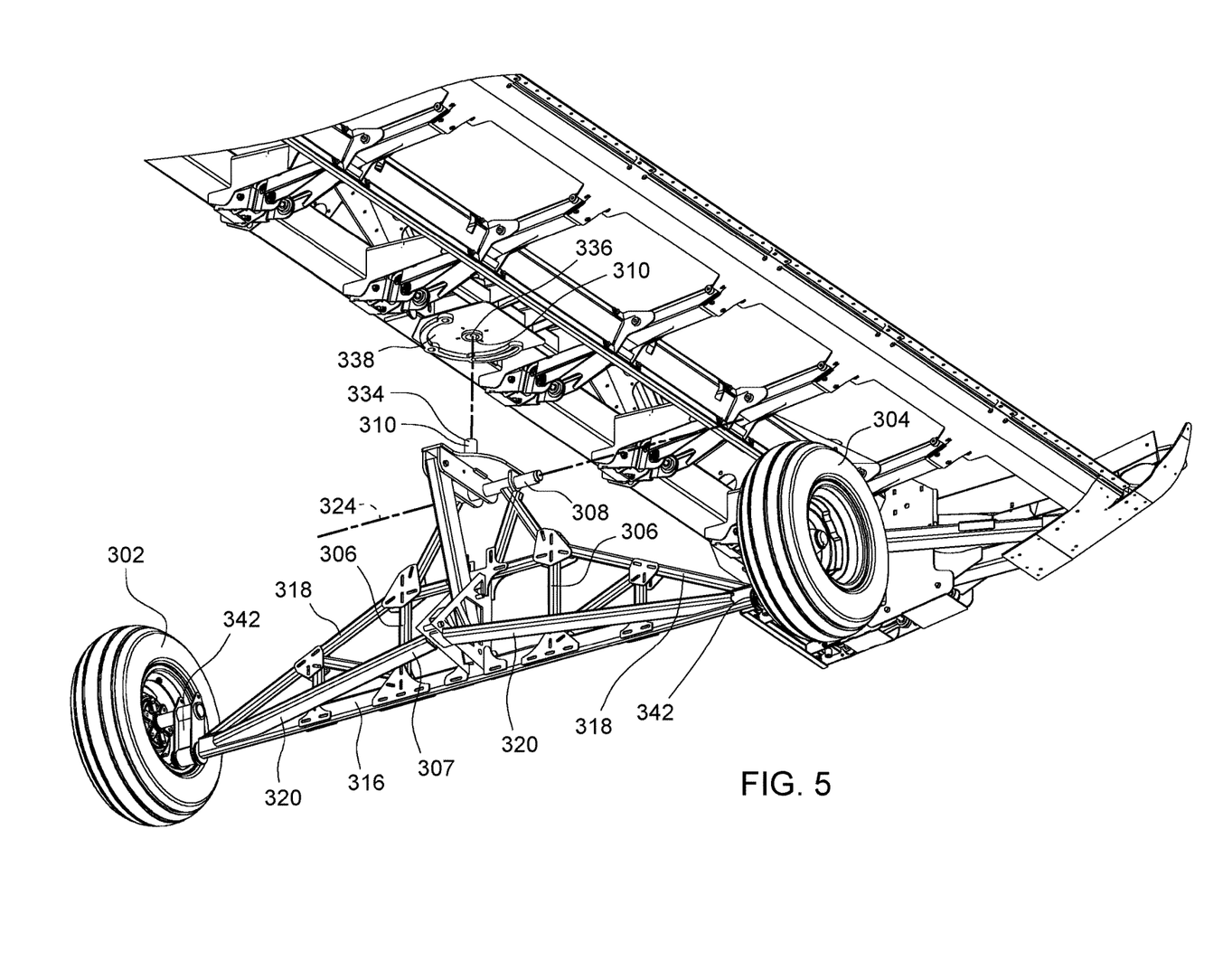
FIG. 5 is an exploded underneath perspective view of the arrangement of FIG. 4.
Figure 6:
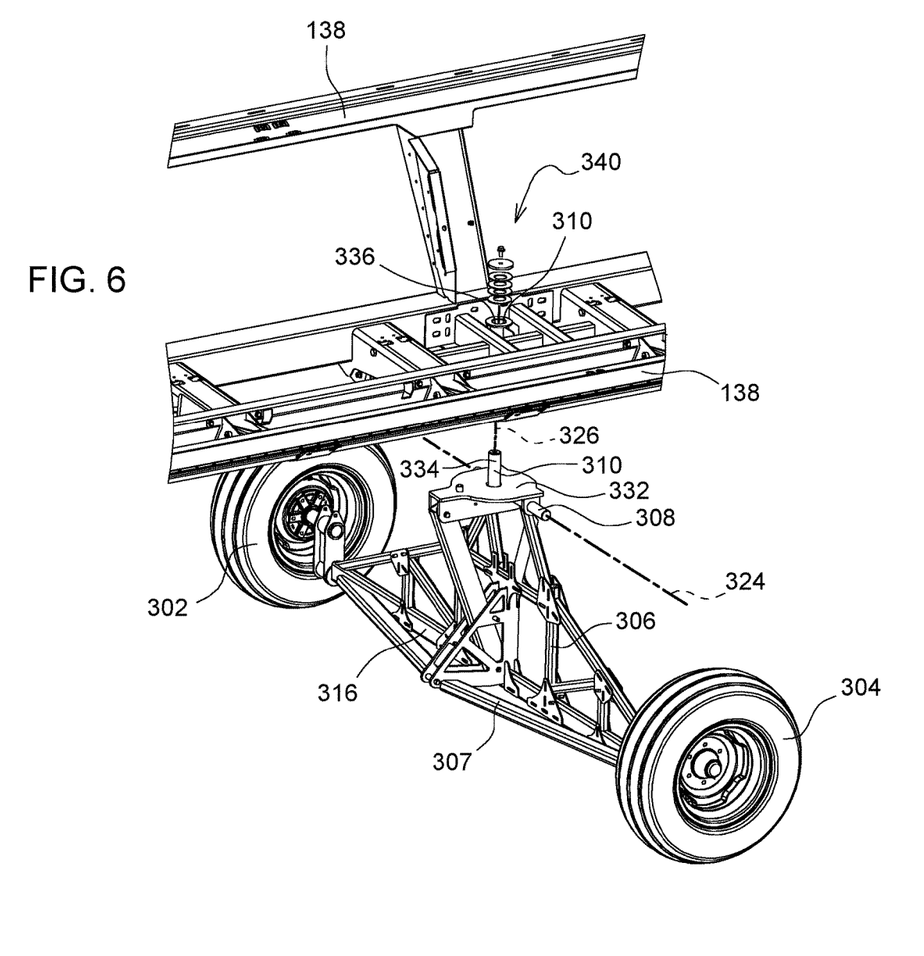
FIG. 6 is an exploded overhead perspective view of the arrangement of FIG. 4.

The first pivot joint 308 includes two cylindrical members that are fixed to a first plate 332. Two mating cylindrical members are fixed to an upper portion of elongate truss 306. The two mating cylindrical members pivot with respect to the two cylindrical members about their common axis 324. In this manner, the elongate truss 306 pivots with respect to the plate 332.

The second pivot joint 310 includes a vertical cylindrical member 334 that is fixed to, extends upward from, and is normal to an upper surface of first plate 332. The vertical cylindrical member 334 extends through a corresponding cylindrical aperture 336 in a mating plate 338 that is fixed to the bottom of the left frame section 138.

Several washers and a fastener 340 are attached to a free end of the vertical cylindrical member 334 that extends above an upper surface of the left frame section 138. These washers and fastener secure the gauge wheel assembly to the left frame section 138, while permitting relative rotation of the vertical cylindrical member 334 with respect to the cylindrical aperture 336.

The first wheel 302 and the second wheel 304 may be solid or composite. They may include a rim to which an inflatable tire is attached. They may include a rim to which a solid tire is attached. They have a diameter between 30 cm and 50 cm. They have a hub that is configured to be supported for free rotation about the end of the elongate truss 306.

Each wheel is connected to its corresponding end of the bottom chord 316 with a corresponding offset link 342.

The first wheel 302 and the second wheel 304 support at least a portion of the weight of the left frame section 138 when the agricultural harvester is traveling over the ground harvesting crops. In another mode of operation, the wheels may support the entire weight of the left frame section 138 during harvesting, thereby permitting the reciprocating knife 128 to be raised above the ground.

The elongate truss 306 extends between the first wheel 302 and the second wheel 304. Both the first wheel 302 and the second wheel 304 are fixed for rotation on the opposing ends of the elongate truss 306. The elongate truss 306 is pivotally coupled to the bottom of the left frame section 138.

In the discussion above, various components and axes are described as extending in a fore-and-aft direction, or extending in a direction parallel to a direction of travel "V", or extending horizontally or longitudinally, will or extending laterally. During normal operation, these components are expected to move. Typically, they can be pivoted or tilted with respect to each other, with respect to the ground, or with respect to the combine during normal operation and therefore are not precisely horizontal, vertical, longitudinally extending or laterally extending.

In the discussion above we have described in detail the gauge wheel assembly 300, how it is attached to the left frame section 138, and how it operates. An identical gauge wheel assembly is constructed, operated, and attached to the right frame section 138 in a mirror location on the right frame section 142. We have not separately illustrated and described this gauge wheel assembly.

The drawings and discussion above are provided to illustrate and explain at least one way of making and use the invention in such detail to enable someone skilled in the art to make and use it. The claims describe the invention itself.

The invention claimed is:

1. An agricultural harvesting head for an agricultural harvester comprising:
    a left frame section disposed to receive crop harvested on a left side of the agricultural harvesting head;
    a right frame section disposed to receive crop harvested on the right side of the agricultural harvesting head;
    a center frame section that is coupled to and disposed to receive the crop harvested from the left frame section and from the right frame section; and
    a first gauge wheel assembly coupled to at least one section of the left frame section and the right frame section that is convertible from (A) a harvesting position in which the first gauge wheel assembly supports the at least one section during crop harvesting, to (B) a transport position in which the first gauge wheel assembly supports the at least one section for road transport,
    wherein the first gauge wheel assembly is pivotable about a first pivot axis parallel to a direction of travel "V" of the agricultural harvester when in the transport position and is pivotable about a second pivot axis perpendicular to the first pivot axis between the harvesting position and the transport position; and
    wherein the first gauge wheel assembly comprises: an elongate truss having a first end and a second end; a first wheel fixed to the first end of the elongate truss; and a second wheel fixed to the second end of the elongate truss.

2. The agricultural harvesting head of claim 1, further comprising: a first pivot joint coupled between the elongate truss and the at least one section that permits the elongate truss and the first and second wheels to pivot as an assembly about a first pivot axis that extends parallel to a longitudinal extent of the at least one section; and a second pivot joint coupled between the elongate truss and the at least one section that permits the elongate truss and the wheels to pivot as an assembly about a second pivot axis that extends vertically while a floor of the at least one section of the left frame in the right frame section remains in a crop harvesting orientation.

3. The agricultural harvesting head of claim 1, wherein the elongate truss comprises a bottom chord, a first top chord fixed to the bottom chord, and a web interconnecting the bottom chord and the first top chord when the first gauge wheel assembly is in the transport position.

4. The agricultural harvesting head of claim 3, wherein the elongate truss comprises the bottom chord, and a second top chord fixed to the bottom chord wherein the second top chord is different than the first top chord.

5. The agricultural harvesting head of claim 4, wherein the first pivot joint is coupled to an apex of the first top chord to permit the elongate truss to pivot about a vertical axis when the first gauge wheel assembly is in the transport position.

6. The agricultural harvesting head of claim 1, wherein the first gauge wheel assembly comprises a first truss and a second truss, wherein the first truss and the second truss share a bottom chord, and wherein the first truss has a first top chord, and the second truss has a second top chord.

7. The agricultural harvesting head of claim 6, wherein the first truss and the second truss are fixed at a right angle to each other, and further wherein the bottom chord extends parallel to a direction of travel "V" of the agricultural harvester in the harvesting position and extends perpendicular to the direction of travel "V" of the agricultural harvester in the transport position.

8. The agricultural harvesting head of claim 6, wherein the first truss is erect when the first gauge wheel assembly is in the transport position, and wherein the second truss is erect when the first gauge wheel assembly is in the harvesting position.

9. An agricultural harvester comprising: an agricultural combine; and an agricultural harvesting head supported on the front of the agricultural combine, wherein the agricultural harvesting head comprises:
    a left frame section disposed to receive crop harvested on a left side of the agricultural harvesting head;
    a right frame section disposed to receive crop harvested on the right side of the agricultural harvesting head;
    a center frame section that is coupled to and disposed to receive the crop harvested from the left frame section and from the right frame section; and
    a first gauge wheel assembly coupled to at least one section of the left frame section and the right frame section that is convertible from (A) a harvesting position in which the first gauge wheel assembly supports the at least one section during crop harvesting, to (B) a transport position in which the first gauge wheel assembly supports the at least one section for road transport,
    wherein the first gauge wheel assembly is pivotable about a first pivot axis parallel to a direction of travel "V" of the agricultural harvester when in the transport position and is pivotable about a second pivot axis perpendicular to the first pivot axis between the harvesting position and the transport position; and
    wherein the first gauge wheel assembly comprises: an elongate truss having a first end and a second end; a first wheel fixed to the first end of the elongate truss; and a second wheel fixed to the second end of the elongate truss.

10. The agricultural harvesting head of claim 1, wherein the first and second wheels are spaced apart a first distance in the harvesting position and are spaced apart the same distance in a transport position.

11. The agricultural harvesting head of claim 1, wherein the first and second wheels are fixed in position relative to each other as they move from the harvesting position to the transport position.

12. The agricultural harvesting head of claim 1, wherein each of the first and second wheels are supported on an offsetting link that in turn is supported on the elongate truss such that each of the wheels rotates about an axis that is generally parallel to and offset from a bottom chord of the elongate truss.

13. The agricultural harvesting head of claim 1, wherein the elongate truss is generally triangular and has an apex disposed midway between and above the first end and the second end.

14. The agricultural harvesting head of claim 2, wherein the second pivot axis is disposed equidistant to the first wheel and the second wheel.

15. The agricultural harvesting head of claim 13, wherein a weight of the at least one section is supported on the apex of the elongate truss when the elongate truss is in the transport position.

16. The agricultural harvesting head of claim 1, wherein the elongate truss has a longitudinal extent, and further wherein a second pivot joint, forming the second pivot axis, constrains the elongate truss to pivot about a vertical axis that is perpendicular to the longitudinal extent of the elongate truss and equidistant from the first wheel and the second wheel.

17. The agricultural harvesting head of claim 1, further comprising a first pivot joint forming the first pivot axis and a second pivot joint forming the second pivot axis, wherein the first pivot joint is pivotable about the second pivot axis.

18. The agricultural harvesting head of claim 1, wherein the at least one section of the left frame section and the right frame section comprises a floor to underlie conveyed crops, and a rear wall having a rear face to face the agricultural harvester, wherein the second pivot axis intersects the floor.

19. The agricultural harvesting head of claim 1, wherein the first pivot axis directly underlies a floor of the at least one section of the left frame section and the right frame section.

\* \* \* \* \*